(No Model.) 3 Sheets—Sheet 2.
J. WALMSLEY & S. LANG.
MACHINE FOR WARPING AND BEAMING YARN.
No. 251,324. Patented Dec. 20, 1881.
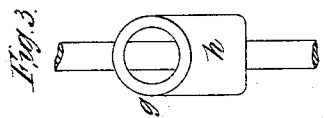
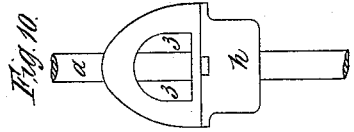
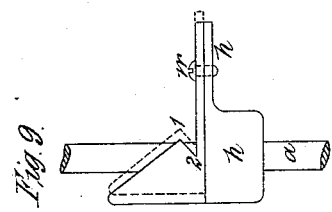
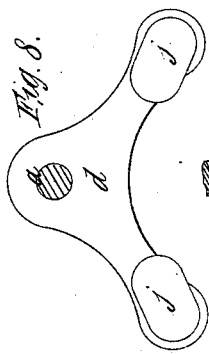
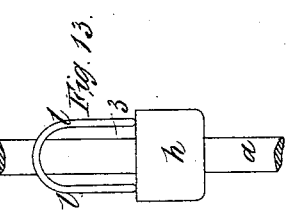
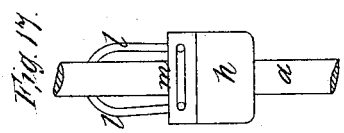
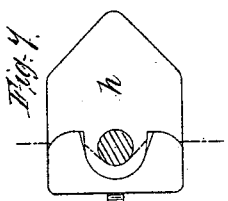
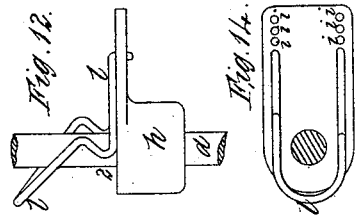
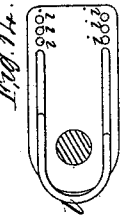
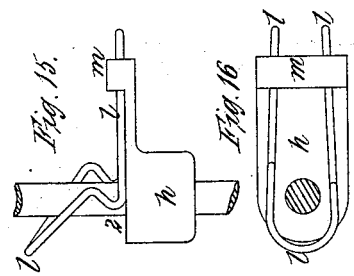
WITNESSES
Katie R. Acker
Charles R. Searle
INVENTOR
James Walmsley
Seth Lang
by their attorney
Thomas D. Stetson (No Model.) 3 Sheets—Sheet 3.
J. WALMSLEY & S. LANG.
MACHINE FOR WARPING AND BEAMING YARN.
No. 251,324. Patented Dec. 20, 1881.
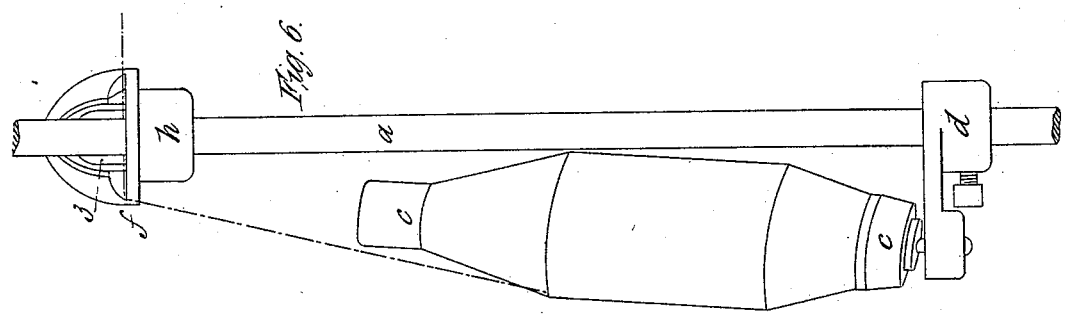
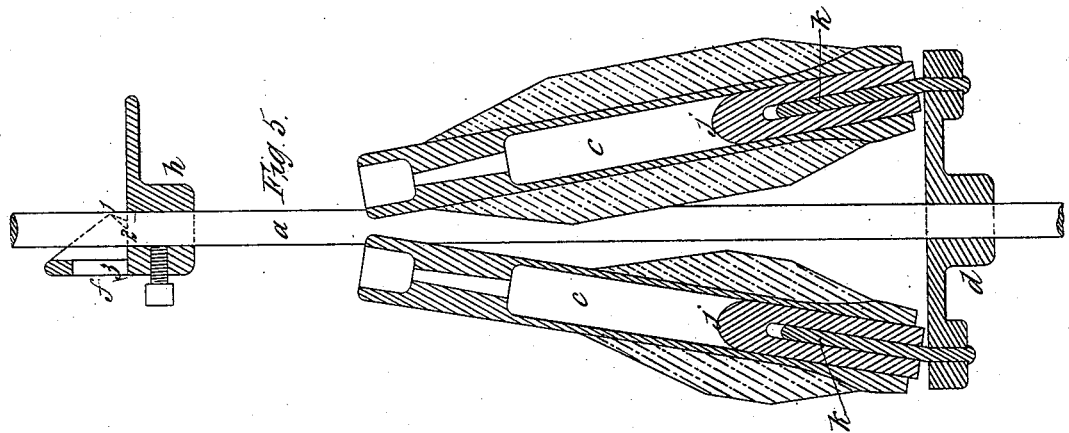
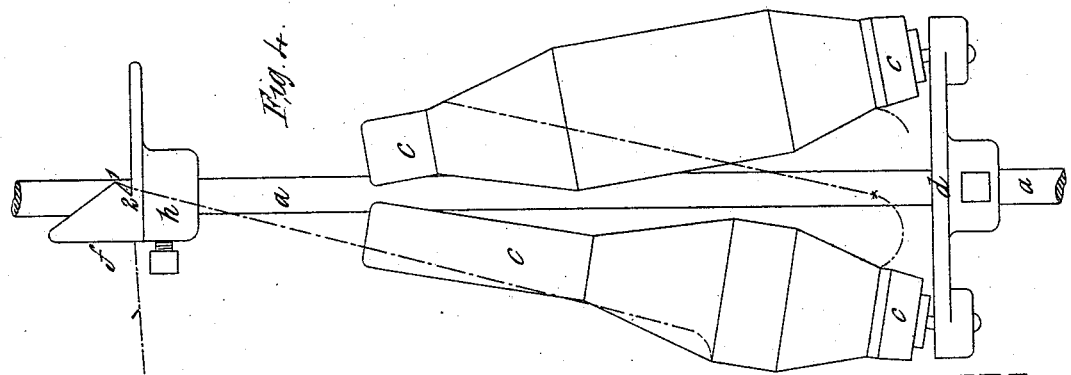
WITNESSES
INVENTOR

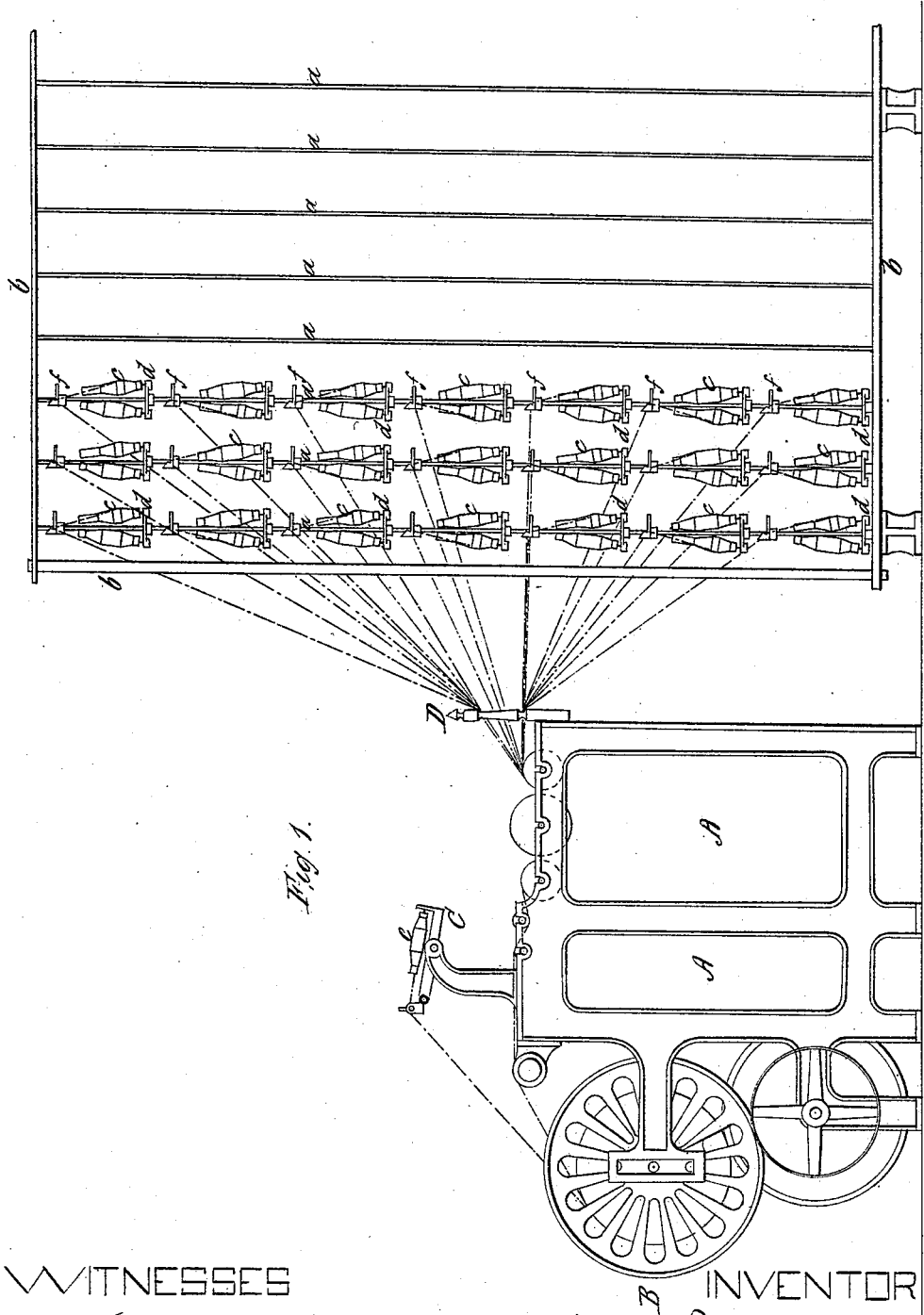

UNITED STATES PATENT OFFICE.

JAMES WALMSLEY AND SETH LANG, OF BLACKBURN, COUNTY OF LANCASTER, ENGLAND.

MACHINE FOR WARPING AND BEAMING YARN.

SPECIFICATION forming part of Letters Patent No. 251,324, dated December 20, 1881.

Application filed June 24, 1881. (No model.) Patented in England July 29, 1880.

*To all whom it may concern:*

Be it known that we, JAMES WALMSLEY and SETH LANG, subjects of the Queen of Great Britain and Ireland, residing at Blackburn, in the county of Lancaster, Kingdom of Great Britain and Ireland, have invented new and Improved Machines for Warping and Beaming Yarn from Ring-Frame Spools, (for which we have obtained a patent in Great Britain, No. 3,119, bearing date July 29, 1880,) of which the following is a specification.

The invention has for its object the provision of adjustable stands upon which the bobbins are placed, and adjustable friction-regulators for the yarn as it is unwound from the bobbins.

It consists in making these bobbin-stands and friction-regulators adjustable on vertical supports, and, further, in having the regulators also adjustable laterally.

The accompanying drawings form a part of this specification and illustrate the invention.

Figure 1 is a side view of a creel having arranged upon it a number of spools, the yarn from which is being delivered to a beam in an ordinary warping-machine. Fig. 2 is an elevation of one form of the friction-regulators. Fig. 3 is a similar view of the same, taken in right angles to that in Fig. 2. Fig. 4 is an elevation of the bobbins mounted upon the rod of the creel, with the friction-regulator shown above. Fig. 5 is a section of the same. Fig. 6 is an elevation of the same, taken at right angles to that in Fig. 4. Fig. 7 is a plan view of the friction-regulator. Fig. 8 is a plan of the stand on which the bobbins are mounted. Fig. 9 is an elevation of the friction-regulator, showing a means for adjustment. Fig. 10 is a similar view taken at right angles to that shown in Fig. 9. Fig. 11 is a plan of the same. Fig. 12 is an elevation of another form of adjustable regulator. Fig. 13 is a view taken at right angles to Fig. 12. Fig. 14 is a plan of the same. Fig. 15 is an elevation showing another means of adjusting the regulator. Fig. 16 is a plan of Fig. 17. Fig. 17 is a view at right angles to that shown in Fig. 15.

The upright rods $a\ a\ a$ are supported in a frame, $b\ b$, the spools $c\ c$ being mounted upon the stands $d\ d$ in pairs, one set above the other. A is the warping-machine, and B the beam upon which the yarn is being wound. A frame, C, extending across the warping-machine, is provided for holding extra spools $e$, the yarn from which supplies the place of any ends which may be broken or disarranged during the process of warping.

D is an ordinary reed, arranged in the usual manner.

A creel having two or more sides may be employed, the sides of which may be placed obliquely to the warping-machine, or in any other convenient position.

The upright rods $a\ a$ may be provided with any desirable number of sets of stands or brackets, arranged one above the other, and secured to the rods by set-screws or other convenient means.

Each set of spools and each spool in the frame $b$ is provided with a friction-regulator, $f$, through which the yarn is drawn in its passage to the beam. The regulator is attached to the upright rod $a$ upon which its own set of spools is mounted, and may be so adjusted upon the rod as to give the desired strain on the yarn between the regulator and the beam. The friction-regulator is in the form of a hollow cylinder, $g$, (see Figs. 2 and 3,) mounted on a block, $h$, capable of sliding upon the upright rod $a$, the cylindrical portion being placed transversely to the rod. The end of the cylinder nearest the rod is sloped downward in an outward direction to a point, 1, about midway of its diameter, below which is a notch, 2, pointing inwardly. The upright rod $a$ passes through the cylinder $g$, within the pointed ends made between the upper slope and the notched indentations (one in front and the other behind the upright rod $a$) below. The yarn is passed over the upper side of the friction-regulator and brought down between the rod and the pointed ends of the cylinder into the notch beneath. The notch prevents the yarn from flying out of the regulator, while the rubbing of the yarn on the rod and the inner edges of the notched indentations gives the necessary friction. By turning the regulator round on the rod more or less friction may be produced, as required.

A modification of the friction-regulator as above described is shown in Figs. 4, 5, 6, and 7, the table or platform $h$ being designed to prevent the yarn from getting beneath the regulator. The aperture 3 is designed for facilitating the egress of stuff or fibers rubbed off the yarn during its passage through the regulator.

The spools c c are arranged to point upwardly in a line with the bottom of the notch 2 in the friction-regulator f. The spools c c are supported upon the barrels (preferably of hard wood, such as box-wood) j j, driven tightly upon the pins k k. The pins k k are preferably of annealed or soft iron, and are cast in with the stand d when molded, and are capable of being readily bent and adjusted, thus providing convenient facilities for adjusting and altering the position and direction of the spools when required. Other modes of adjustment may be employed; but we prefer the employment of soft-metal pins, as above described, as being at once durable and economical in first cost.

The arrangement above described for mounting spools spun on ring-spindles is equally applicable, with slight modifications, for mounting spools spun on mule or other spindles.

In Figs. 9, 10, and 11 is shown a friction-regulator provided with the upper portion adjustable by means of the slot x and screw w, so that the position of the notch 2 relatively to the rod a may be varied. By this arrangement the amount of drag upon the yarn may be increased or decreased as may be found requisite.

In Figs. 12, 13, and 14 is represented a friction-regulator the upper portions of which are formed of wire, preferably of steel. The ends of the wire l are bent downward and inserted in the holes i i, several sets of holes being provided, so that the position of the notch may be varied as required.

In Figs. 15, 16, and 17 the ends of the wire l may be sprung or pressed into holes or into a slot opening in the lip m. In some cases, however, we prefer to place the front notch central with the upright rod a and vary the friction by the position of the back notch, as shown in Figs. 12, 14, 15, and 16.

It will be evident that the construction of creel shown and described and the mode of mounting and arranging the spools thereon, in conjunction with the friction-regulators, may be readily adapted for reeling, as well as for beaming, as above described.

What we claim is—

1. The combination, with the creel-rods, of a bobbin-stand upon which the bobbins rest, and a friction-regulator for the yarn, said stand and regulator being independently adjustable up and down the rod, substantially as set forth.

2. The combination, with the creel-rods, of a series of stands upon which the bobbins are supported on suitable pins, and of a friction-regulator for each stand, which is adjustable both laterally and vertically, as herein specified.

3. The combination of a vertically and laterally adjustable drag or friction device for causing friction upon the yarn in its passage from the spools to the beam, a rod carrying said device, and an adjustable stand mounted upon said rod and provided with pins and barrels for supporting spools, substantially as set forth.

JAMES WALMSLEY.
SETH LANG.

Witnesses:
    YATES W. BOOTH,
    WILL. MELLING,
        *Both of Preston.*